United States Patent

Roulund

[11] 4,071,754
[45] Jan. 31, 1978

[54] BEAM ALIGNMENT DETECTOR

[75] Inventor: Poul B. Roulund, Irving, Tex.

[73] Assignee: Xerox Corporation, Stamford, Conn.

[21] Appl. No.: 679,640

[22] Filed: Apr. 22, 1976

[51] Int. Cl.² ............................ G02B 5/14; H01J 5/16; H01J 39/12
[52] U.S. Cl. .................................... 250/227; 250/563; 356/172; 350/7
[58] Field of Search ............... 250/227, 201, 202, 563, 250/562, 570; 356/154, 172; 350/7

[56] References Cited

U.S. PATENT DOCUMENTS

| | | | |
|---|---|---|---|
| 3,878,399 | 4/1975 | Higuchi et al. | 250/570 |
| 3,919,561 | 11/1975 | Coberley | 250/227 |
| 3,922,485 | 11/1975 | Starkweather et al. | 350/7 |

*Primary Examiner*—Alfred E. Smith
*Assistant Examiner*—David K. Moore
*Attorney, Agent, or Firm*—Sheldon F. Raizes

[57] ABSTRACT

A mechanism is provided for observing laser beam alignment with a start-of-scan detector chip, while the laser beam is being scanned in a horizontal direction. The start-of-scan detector is located on a target panel along with the input ends of a plurality of fiber-optic bundles. The input ends are in a vertical array with the input end in the center of the array being horizontally aligned with the detector chip whereby the scanned laser beam will strike both the chip and the center input end when the beam is aligned with the chip. If the beam is misaligned with the chip, the beam will strike one of the other input ends depending upon if the beam is too high or too low. The output ends of the fiber-optic bundles are arranged on an observation display panel to allow an observer to determine beam alignment or misalignment depending upon which output end is illuminated.

9 Claims, 3 Drawing Figures

BEAM ALIGNMENT DETECTOR

DESCRIPTION OF THE INVENTION

Due to the danger characteristics of a laser and to code restrictions on lasers, a laser is inaccessible to a serviceperson while it is operating. This does not permit a serviceperson to check out alignment of a laser beam with a start-of-scan and end-of-scan detector chips in a laser scanning system. A slight error in beam alignment can cause the beam to entirely miss the chips resulting in failure of the scanning system without the serviceperson realizing that the problem resides in beam alignment rather than in other parts of the system.

It is an object of this invention to provide a mechanism for determining the alignment of a scan laser beam while the beam is being scanned.

Other objects of the invention will become apparent from the following description with reference to the drawing wherein.

Figure 1:
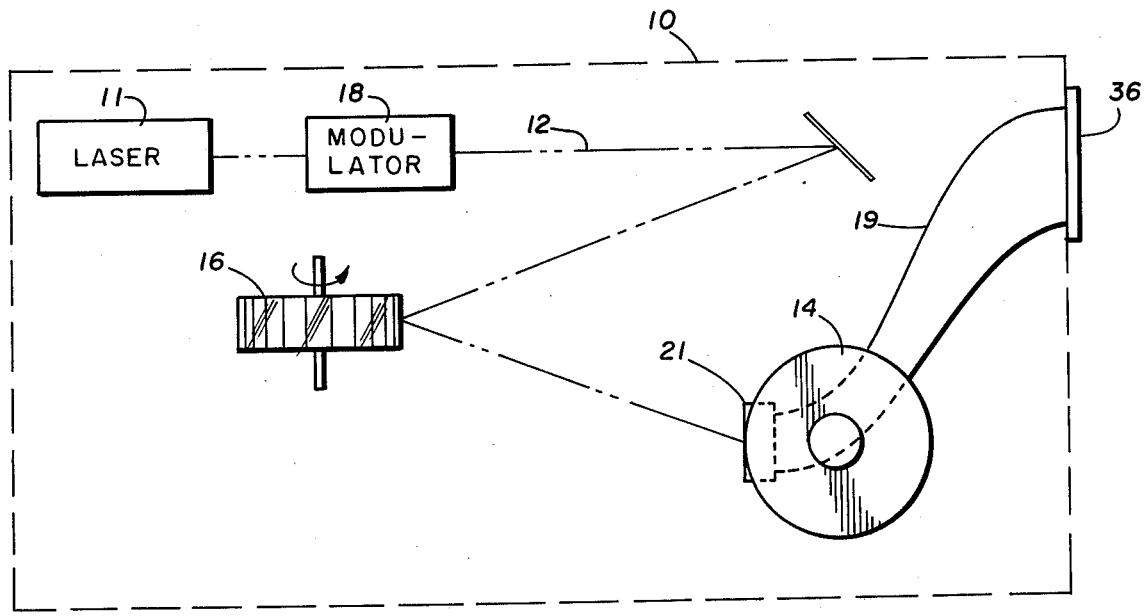
FIG. 1 is a side schematic view of a scanning system.
Figure 2:
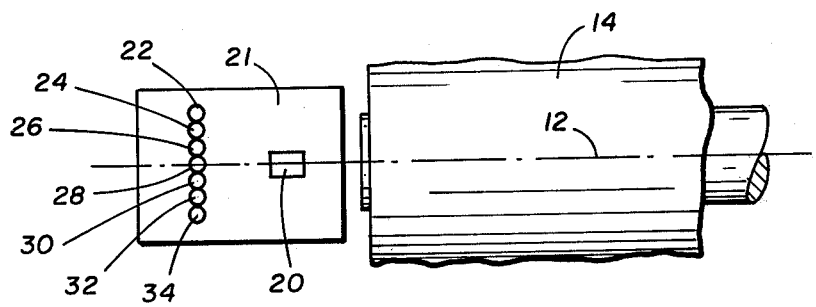
FIG. 2 is a partial front view of a photoconductor drum and the target input panel of a beam alignment detector.

Referring to FIG. 1, a schematic outline of a frame of a printing machine is shown in phantom and is generally designated by reference numeral 10. A laser 11 generates a collimated beam 12 which is scanned across a photoconductor drum 14 by rotating polygon 16 to expose the same and effect a latent image thereon. The beam 12 passes through a modulator 18 which modulates the beam in accordance with information contained in an electrical signal. The latent image is developed by normal xerographic methods with toner particles, and the developed image is transferred to a copy medium.

A start-of-scan detector chip 20 is located on a target panel 21 fixedly secured to the frame 10 at one side of the photoconductor drum 14 and is in the path of the scanned beam 12. Synchronization of some of the system's functions is dependent upon a signal generated by the detector chip 20. Thus, if the beam 12 is misaligned with the chip 20, the functions dependent upon a signal from the chip will not operate correctly. Due to the danger characteristics of lasers and to the code restrictions on lasers, it is not possible for a serviceperson to check out alignment of the laser beam, while the laser is operating. Thus, a serviceperson is unable to see if misalignment is the cause of malfunction of components of the system dependent upon a signal from the detector chip 20 unless a special arrangement is provided, such as the arrangement provided herein.

A cable 19 of fiber-optic bundles 22, 24, 26, 28, 30, 32 and 34 are provided with the input end of each being arranged in a vertical array on the panel 21 adjacent to the chip 20 with the center of the end of bundle 28 being horizontally aligned with the center of the chip 20. Preferably, the input ends are contiguous each other. A typical dimension of the chip 20 may be about 20 mils square, and the glass-fiber bundle will be about 19½ mils in diameter. The beam spot will be about 5 mils in diameter. The output ends of the fiber bundles are located in a vertical array on an observation display panel 36 which is also located on the frame 10 adjacent to a mechanism (not shown) for adjusting alignment of the laser beam 12 with the chip 20. The output end of bundle 28 is located in the center of the display panel 36 by itself with the output ends of the three bundles 22, 24 and 26 being grouped above the output end of bundle 28 and the output ends of three bundles 28, 30 and 32 being grouped below the output end of bundle 28. If the beam is aligned with the detector chip 20, the input end of the bundle 28 will be struck by the beam illuminating the output end of the bundle 28 to indicate to a serviceperson that the beam is aligned. If the beam is too high, the beam will strike one of the input ends of bundles 22, 24 and 26 depending upon how far out of alignment the beam is. If the beam is too low, the beam will strike one of the input ends of bundles 30, 32 and 34 depending upon how far out of alignment the beam is. The serviceperson can determine if the beam is out of alignment and, if so, how much, by observing which output end is illuminated. Proper indicia may be placed adjacent to each output end of the fiber bundles to indicate alignment or the direction of non-alignment.

Figure 3:
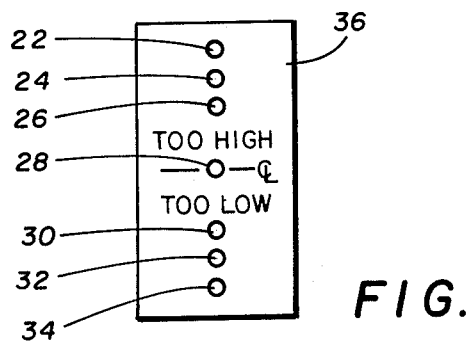
FIG. 3 is a view of a beam alignment observation panel.

The output ends of the fiber bundles do not have to be arranged on the display panel 21 in a vertical array, as shown in FIG. 3, but may be in a horizontal array with the output end designating alignment being the center one. Also, the output ends may be arranged in other suitable arrays as long as the output ends, which indicate the beam is too high, are grouped together; and output ends, which indicate the beam is too low, are grouped together; and the output end indicating beam alignment is in between or separate from each group. Again, proper indicia would indicate which output end represents the beam being aligned, which output ends represent the beam being too high, and which output ends represent the beam being too low.

Since the beam is scanned in a horizontal direction, the input ends of the fiber bundles do not need to be vertically aligned but must be on different horizontal levels to indicate the amount of beam misalignment. Thus, the array of the fiber bundle input ends may take any suitable arrangement as long as the input ends are at different horizontal levels, and one input end is horizontally aligned with the chip 20.

It should be understood that the target panel 21 and its associated start-of-scan detector chip 20 and the input ends of the fiber-optic bundles 22, 24, 26, 28 and 30 need not be adjacent the photoconductor drum 14 but may be located in other locations to which a portion of a scanning beam is deflected as illustrated, for instance, in U.S. Pat. No. 3,922,485.

What is claimed is:

1. In a scanning system: an illumination source generating a beam; means for scanning said beam as a spot across a target area; a detector located at said target area; an indicator for indicating alignment and misalignment of said beam with said detector; said indicator comprising at least three fiber-optic bundles, each of said bundles having an input end and an output end; said detector being aligned with one of said bundle input ends in the direction of scan; the remaining bundle input ends being located one on each side of said one bundle input end in a direction transverse to said direction of scan; the output ends of said bundles being located at an observation area remote from said target area.

2. The structure as recited in claim 1 wherein the direction of scan is in the horizontal direction, and the three input ends are located at different vertical levels with respect to one another.

3. The structure as recited in claim 2 wherein the three input ends are vertically aligned with one another.

4. The structure as recited in claim 2 wherein the output ends of a respective bundle at the observation area are arranged in the same order relative to each other as the input ends are.

5. The structure as recited in claim 3 wherein said input ends are contiguous each other.

6. In a scanning system: an illumination source generating a beam; means for horizontally scanning said beam as a spot across a target area; a detector located at said target area; an indicator for indicating alignment and misalignment of said beam with said detector; said indicator comprising a plurality of fiber-optic bundles, each of said bundles having an input end and an output end; said input ends being located at said target area; each of said input ends being at a different vertical level than another of said input ends; said detector being aligned with one of said bundle input ends in the direction of scan; one group of input ends being located vertically above said one bundle input end and another group of input ends being located vertically below said one bundle input end; the output ends of said bundles being located at an observation area remote from said target area.

7. The structure as recited in claim 6 wherein the input ends are vertically aligned with one another.

8. The structure as recited in claim 7 wherein the output ends of a respective bundle at the observation area are arranged in the same order relative to each other as the input ends are.

9. The structure as recited in claim 7 wherein said input ends are contiguous each other.

* * * * *